(12) United States Patent
Hahn et al.

(10) Patent No.: US 7,296,171 B2
(45) Date of Patent: Nov. 13, 2007

(54) SELECTING A POWER STATE BASED ON PREDEFINED PARAMETERS

(75) Inventors: Christopher M. Hahn, Bellevue, WA (US); Jonathan Moishe Lettvin, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 395 days.

(21) Appl. No.: 10/984,993

(22) Filed: Nov. 10, 2004

(65) Prior Publication Data

US 2006/0101292 A1 May 11, 2006

(51) Int. Cl.
*G06F 1/00* (2006.01)
(52) U.S. Cl. ............... 713/324; 713/300; 713/320; 713/340
(58) Field of Classification Search ........... 713/300, 713/320, 324, 340
See application file for complete search history.

(56) References Cited

U.S. PATENT DOCUMENTS

| | | | | |
|---|---|---|---|---|
| 5,315,161 | A * | 5/1994 | Robinson et al. | 307/66 |
| 6,427,072 | B1 | 7/2002 | Reichelt | |
| 6,885,974 | B2 * | 4/2005 | Holle | 702/182 |
| 7,131,011 | B2 * | 10/2006 | Westerinen et al. | 713/300 |
| 2003/0212928 | A1 * | 11/2003 | Srivastava et al. | 714/47 |

OTHER PUBLICATIONS

Advanced Configuration and Power Interface Specifications, Revision 2.0c, Aug. 25, 2003, 488 pages.*

"System Power Status", Webpage (from http://msdn.microsoft.com); date of first publication unknown but prior to Oct. 19, 2004.
"Machine Power Policy", Webpage (from http://msdn.microsoft.com); date of first publication unknown but prior to Oct. 19, 2004.
"System Battery State", Webpage (from http://msdn.microsoft.com); date of first publication unknown but prior to Oct. 19, 2004.
"System Power Policy", Webpage (from http://msdn.microsoft.com); date of first publication unknown but prior to Oct. 19, 2004.
"System Power Capabilities", Webpage (from http://msdn.microsoft.com); date of first publication unknown but prior to Oct. 19, 2004.
"System Power States", Webpage (from http://msdn.microsoft.com); date of first publication unknown but prior to Oct. 15, 2004.
"Advanced Configuration and Power Interface Specification", Revision 3.0, Sep. 2, 2004, 602 pages.

* cited by examiner

*Primary Examiner*—Thomas Lee
*Assistant Examiner*—Jaweed A Abbaszadeh
(74) *Attorney, Agent, or Firm*—Banner & Witcoff, Ltd.

(57) ABSTRACT

An algorithm automatically selects a power state based on device configuration parameters. The selected power state may then be returned and/or automatically implemented in a shutdown of the device. The parameters can include whether the device supports a system battery, whether the device is connected to an uninterruptible power supply, whether a value is available for remaining battery life, whether the device is receiving AC power and/or whether a hibernate fail safe feature is available. A shutdown failure algorithm may also be included. The shutdown failure algorithm detects a failed attempt to shut down the device using a selected power state. The power state selection is changed and shutdown is then re-attempted. If shutdown again fails, a force shutdown flag is set. If shutdown again fails, a shutdown failure is reported.

28 Claims, 8 Drawing Sheets

SELECTING A POWER STATE BASED ON PREDEFINED PARAMETERS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention generally relates to power management in electronic devices such as personal computers. More specifically, this invention relates to selection of a powered down condition which minimizes user inconvenience associated with re-powering a device while also minimizing the potential for loss of data.

BACKGROUND OF THE INVENTION

As electronic data processing devices such as personal computers become more complex, the time required to activate these devices continues to grow. Booting a computer from a completely powered down state is a common example. The time required to load an operating system and various applications into RAM and initialize those programs increases as the complexity of the operating system and applications increase. Many users find extended boot cycle times to be frustrating.

"Sleeping" power states offer a partial solution to this problem. Instead of completely shutting down a computer so as to require a full OS reboot when returning the computer to a working state, various intermediate power-down states can be invoked. Returning a computer to a fully active state from one of these intermediate states is generally faster than a reboot. Various system states are defined in the Advanced Configuration Power Interface Specification (revision 3.0) ("ACPI specification"), available from <http://www.acpi.info/>, incorporated by reference herein for purposes of illustrating the state of the art. In a G0 (or working) state, the computer is executing user-made application threads and is responding to external events in real time. State S3 is defined as a low-latency sleeping state. Power is removed from the CPU (central processing unit), cache and chipset in an S3 state, but is maintained to system memory (RAM). Returning the computer to a G0 state (or "waking" the computer) is relatively fast, as previous programming context is still in RAM. State S4 is defined as a lower-power, longer wake-latency sleep state. When entering an S4 state, current platform context (e.g., system and programming settings) is saved from RAM to the hard drive, and power is then removed from the RAM, CPU, cache and chipset. When the system is returned to G0 from S4, platform context is restored from the hard drive without rebooting the OS. Waking from S4 requires more time than waking from an S3 state, but less time than an OS reboot. State S5 is defined as a "soft" off state. Context is not saved from RAM to the hard drive, and a complete OS reboot is necessary for returning to a G0 state.

Although it might first seem that state S3 is preferable to state S4 when putting a computer to sleep, this is not always the case. If a computer were to suddenly lose power when in an S3 state, data could be lost. Because program data has not been saved from RAM to a hard drive (or other non-volatile storage), that data could be lost if power to RAM were suddenly lost. This could occur, for example, if the computer's battery were to run out of power faster than expected. Some hardware vendors offer a "hibernate fail safe" feature in order to reduce this risk. The hibernate fail safe feature monitors battery power when the computer is in an S3 state. When battery power drops below a certain level, the fail safe wakes the computer and then places the computer in an S4 state. A "doze time out" algorithm is another mechanism used to avoid data loss. A doze time out algorithm measures the amount of time a computer has been in an S3 state. After a preset amount of time (the doze time out) expires, the computer is placed in an S4 state.

Despite these advances, many challenges remain. Many computer users do not take the time to determine which sleep mode may be the best choice for a particular set of system conditions. The user may not know if his or her system has a hibernate fail safe algorithm. Indeed, the user may be unaware that S3 or S4 states are even available. Although automating the selection of sleeping states would be desirable, doing so presents numerous difficulties to an operating system developer. An operating system will typically be used with many different computer manufacturers' products; some of those products may support hibernate fail safe, but some will not. The products may have different power consumption characteristics when in an S3 state, thus affecting the time during which a particular computer could be safely left in S3. Products may be used with different types of batteries having different capacities. A user may operate a particular computer in a variety of manners. For example, a laptop computer could be used with the AC adapter attached, and with the battery removed.

For these and other reasons, there remains a need for systems and methods to automatically select a power state for a computer or other device.

SUMMARY OF THE INVENTION

Embodiments of the invention address the above-described challenges by providing an algorithm for automatically selecting a power state based on various configuration parameters of a computer or other electronic device. The selected power state may then be returned and/or automatically implemented when shutting down the device. Upon receiving a request to select a power state, various device configuration parameters are examined. Those parameters can include whether the device supports a system battery (e.g., a rechargeable battery such as is commonly used with many lap top computers), whether the device is connected to an uninterruptible power supply, whether a value is available for remaining battery life, whether the device is receiving AC power and/or whether a hibernate fail safe feature is available. Based on the various system parameters examined, a power state is selected. In at least some embodiments, a shutdown failure algorithm is also included. In some embodiments, the shutdown failure algorithm detects a failed attempt to shut down the device using a selected power state. The power state selection is changed and shutdown is then re-attempted. If shutdown again fails, a force shutdown flag is set. If shutdown again fails, a shutdown failure is reported.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE PREFERRED EMBODIMENTS

Figure 1:
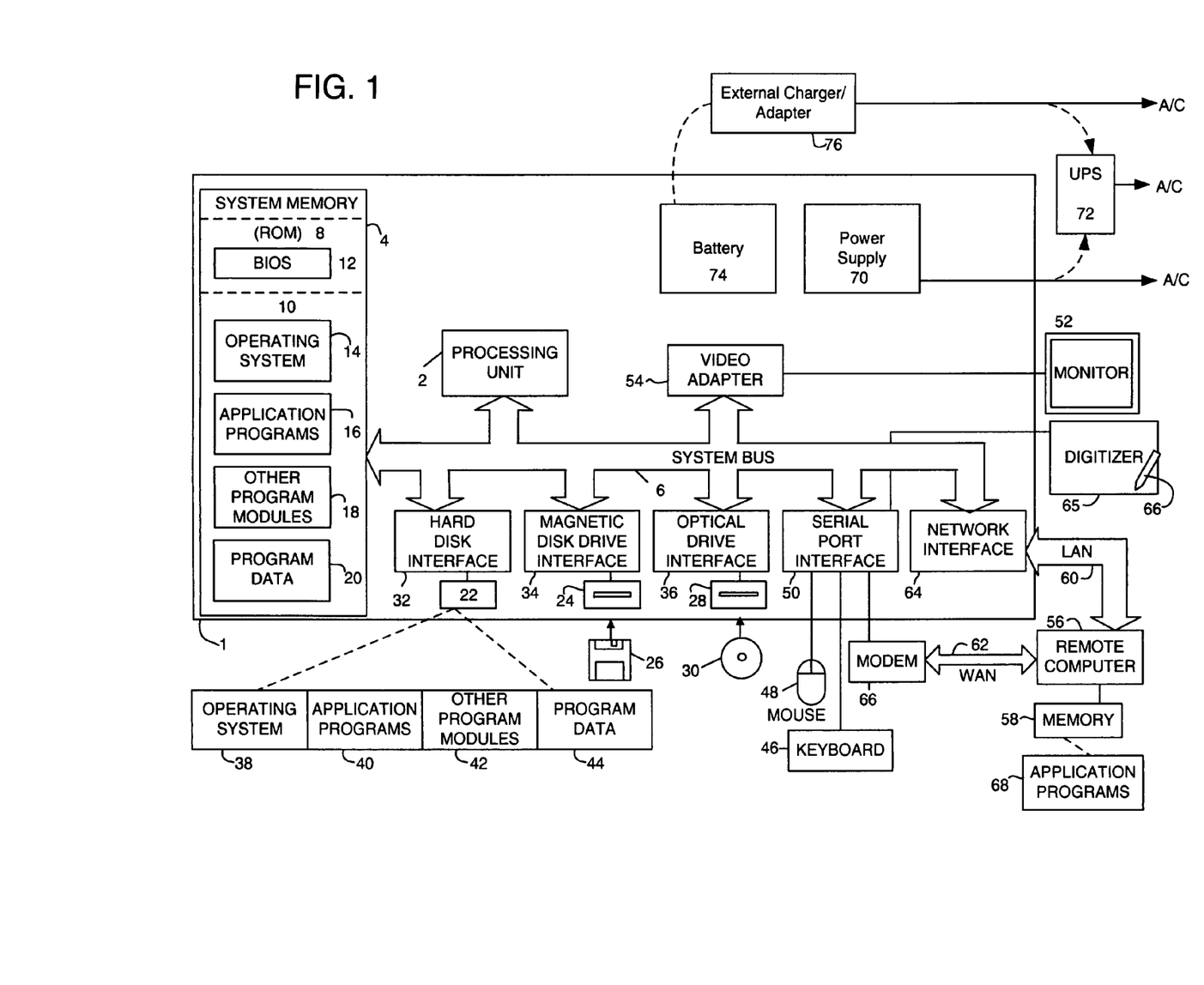
FIG. 1 is a block diagram of an example of a computing system environment in which embodiments of the invention may be implemented.

FIG. 1 illustrates an example of a suitable computing system environment 1 in which the invention may be implemented. The computing system environment 1 is only one example of a suitable computing environment and is not intended to suggest any limitation as to the scope of use or functionality of the invention. Neither should the computing environment 1 be interpreted as having any dependency or requirement relating to any one or combination of components illustrated in the exemplary computing environment 1. Embodiments of the invention will also be described using as examples data structures found in the WINDOWS operating system (available from Microsoft Corporation of Redmond, Wash.). However, the invention is not limited to implementation in connection with a specific operating system.

The invention is operational with numerous other general purpose or special purpose computing system environments or configurations. Examples of well known computing systems, environments and/or configurations that may be suitable for use with the invention include, but are not limited to, personal computers, server computers, hand-held or laptop devices, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 1. Hardware components of computer 1 may include, but are not limited to, processing unit 2, system memory 4 and system bus 6 that couples various system components (including system memory 4) to processing unit 2. System bus 6 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus also known as Mezzanine bus.

Computer 1 typically includes a variety of computer readable media. Computer readable media can be any available media that can be accessed by computer 1 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 4 includes computer storage media in the form of volatile and/or nonvolatile memory such as read only memory (ROM) 8 and random access memory (RAM) 10. Basic input/output system 12 (BIOS), containing the basic routines that help to transfer information between elements within computer 1, such as during start-up, is typically stored in ROM 8. RAM 10 typically contains data and/or program modules that are immediately accessible to and/or presently being operated on by processing unit 2. By way of example, and not limitation, FIG. 1 illustrates operating system (OS) 14, application programs 16, other program modules 18 and program data 20.

Computer 1 may also include other removable/non-removable, volatile/nonvolatile computer storage media. By way of example only, FIG. 1 illustrates hard disk drive 22 that reads from or writes to non-removable, nonvolatile magnetic media, magnetic disk drive 24 that reads from or writes to removable, nonvolatile magnetic disk 26 and optical disk drive 28 that reads from or writes to removable, nonvolatile optical disk 30 such as a CD ROM, CDRW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 22 is typically connected to system bus 6 through a non-removable memory interface such as interface 32, and magnetic disk drive 24 and optical disk drive 28 are typically connected to system bus 6 by a removable memory interface, such as interfaces 34 and 36.

The drives and their associated computer storage media, discussed above and illustrated in FIG. 1, provide storage of computer readable instructions, data structures, program modules and other data for computer 1. In FIG. 1, for example, hard disk drive 22 is illustrated as storing OS 38, application programs 40, other program modules 42 and program data 44. Note that these components can either be the same as or different from OS 14, application programs 16, other program modules 18 and program data 20. OS 38, application programs 40, other program modules 42 and program data 44 are given different numbers here to illustrate that, at a minimum, they are different copies. A user may enter commands and information into computer 1 through input devices such as keyboard 46 and pointing device 48 (shown as a mouse, but which could be a trackball or touch pad). Other input devices (not shown) may include a microphone, joystick, game pad, satellite dish, scanner, or the like. These and other input devices are often connected to processing unit 2 through user input interface 50 that is coupled to the system bus. Although mouse 48, keyboard 46 and modem 66 are shown in FIG. 1 as connected to computer 1 through a serial port, these and other devices may be connected to computer 1 through other ports (e.g., a parallel port, PS/2 port, game port or a universal serial bus (USB) port) and related interfaces and structures. Monitor 52 or other type of display device is also connected to system bus 6 via an interface, such as video interface 54. In addition to the monitor, computers may also include other peripheral output devices such as speakers (not shown) and a printer (not shown), which may be connected through an output peripheral interface (not shown).

Computer 1 may operate in a networked environment using logical connections to one or more remote computers, such as remote computer 56. Remote computer 56 may be a personal computer, a server, a router, a network PC, a peer device or other common network node, and typically includes many or all of the elements described above relative to computer 1, although only memory storage device 58 has been illustrated in FIG. 1. The logical connections depicted in FIG. 1 include local area network (LAN) 60 and wide area network (WAN) 62, but may also include other networks. Such networking environments are commonplace in offices, enterprise-wide computer networks, intranets and the Internet.

When used in a LAN networking environment, computer 1 is connected to LAN 60 through network interface or adapter 64. When used in a WAN networking environment, computer 1 may include modem 66 or other means for establishing communications over WAN 62, such as the Internet. Computer 1 may also access WAN 62 and/or the Internet via network interface 64. Modem 66, which may be internal or external, may be connected to system bus 6 via user input interface 50 or other appropriate mechanism. In a networked environment, program modules depicted relative to computer 1, or portions thereof, may be stored in the remote memory storage device. By way of example, and not limitation, FIG. 1 illustrates remote application programs 68 as residing on memory device 58. It will be appreciated that the network connections shown are exemplary and other means of establishing a communications link between computers may be used.

Computer 1 may receive electrical power from various sources. In some embodiments, computer 1 may have an internal power supply 70 which receives AC power via a line cord (e.g., from a common household power outlet) and converts same to DC power having voltage and current ranges usable by computer 10. Power supply 70 may be directly plugged into an AC outlet, or may be connected to an uninterruptible power supply (UPS) 72. UPS 72 receives AC power from a wall outlet and passes same on to power supply 70 (e.g., the line cord from power supply 70 may be connected to UPS 72 instead of a wall outlet). UPS 72 includes batteries that are able to provide power to power supply 70 in the event of an interruption of the line current from the wall outlet. UPS 72 may also be in data communication with computer 1 via a serial cable (not shown), USB cable (not shown) or otherwise. Various software programs supporting extended functionality of UPS 72 may also be installed on computer 1. In still other embodiments, computer 10 may have a system battery 74. In this configuration, which is typical of many laptop computers, a separate external power supply 76 is connectable to computer 1. External power supply 76 converts AC power from a wall outlet into DC power, which is then used to recharge battery 74. External power supply 76 may also be used to power computer 1 if, e.g., battery 74 is depleted or removed.

At any given time, a particular computer could have one of numerous possible combinations of the power sources shown in FIG. 1. For example, a laptop computer equipped with a system battery 74 could be connected to external power supply 76, with external power supply 76 then connected to UPS 72. That same laptop computer might later be operated with battery 74 removed, and external power supply 76 plugged directly into a wall outlet. Battery 74 may be fully charged, fully discharged, or at some state of intermediate charge. Determining a sleep state for the computer which offers the fastest time for returning to a working state, and with the lowest risk of data loss, is dependent upon the current condition of the computer.

In at least some embodiments, it is a goal to recommend an S3 sleep state whenever it is safe to do so. The S3 state requires the smallest amount of time to return the computer to a G0 (working) state, and minimizes user inconvenience. However, there are a number of conditions under which an S3 state is likely to result in loss of a user's data. If the computer's battery charge is depleted before the computer is placed in an S4 (hibernate) state, data could be lost. Determining whether an S3 state is appropriate requires a consideration of multiple aspects of the computer's current condition.

Figure 2:
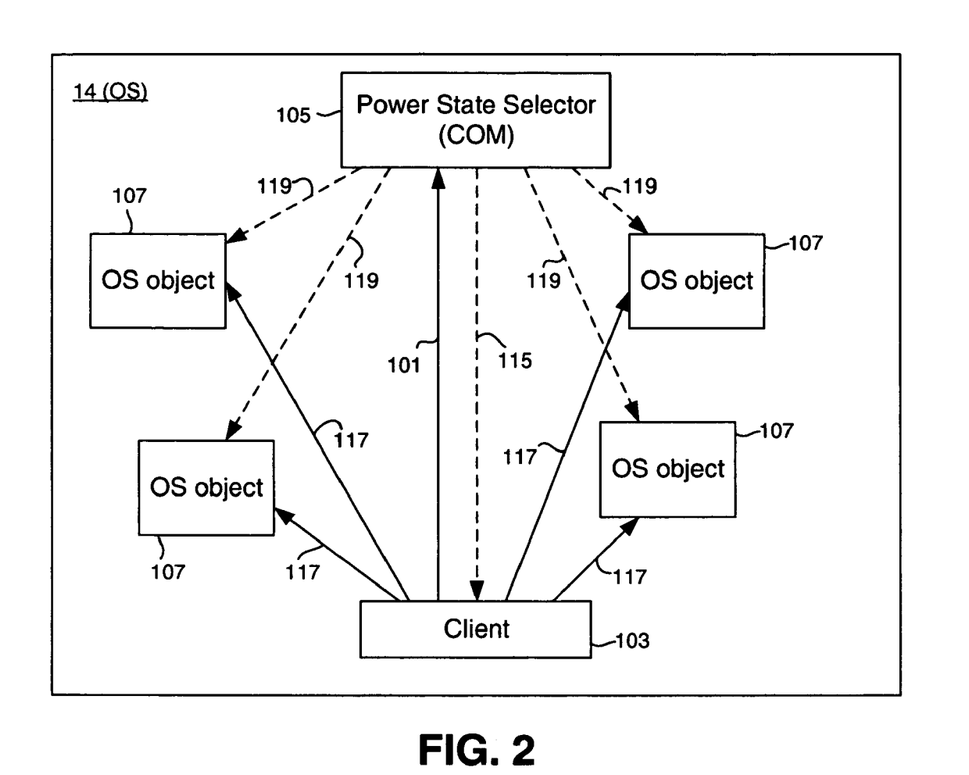
FIG. 2 is a block diagram of an operating system (OS) implementing embodiments of the invention.
Figure 3:
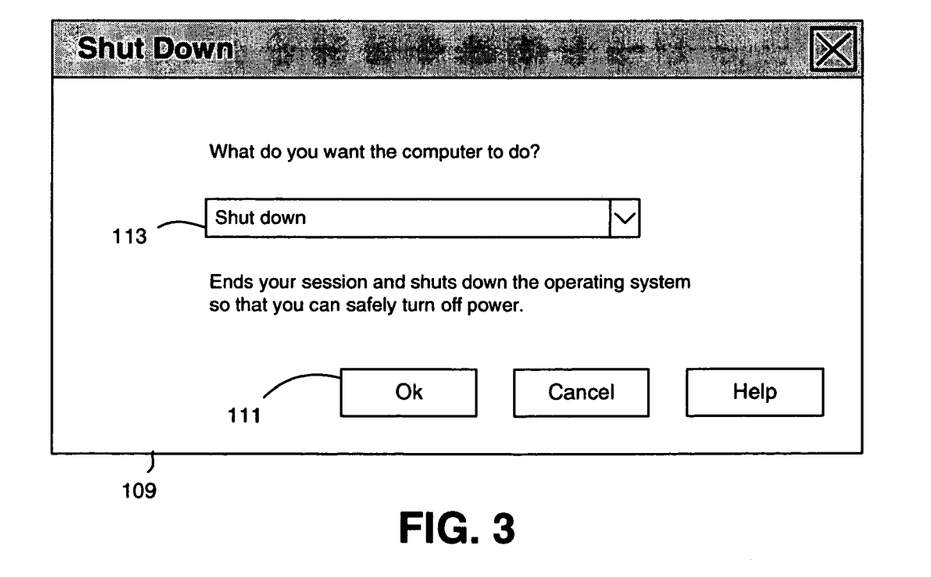
FIG. 3 is a drawing of a shutdown user interface (UI) according to at least some embodiments of the invention.

FIG. 2 is a block diagram of operating system (OS) 14 (FIG. 1) which determines an appropriate sleep state when computer 1 is being shut down. OS 14 includes numerous client objects which interact with one or more host objects and/or with each other so as to perform the various functions of OS 14. At least one client object 103 receives input from a user regarding shutdown of computer 1. For example, a user may invoke a shutdown dialog user interface (UI) by selecting an icon on a display screen. Upon invoking the shutdown UI, client object 103 causes the shutdown dialog to be displayed and executes instructions in response to user interaction with the dialog. An example of a shutdown dialog is shown in FIG. 3. As shown in FIG. 3, dialog 109 includes a drop down list 113 providing various options, e.g., shut down (shown), restart, stand by, etc. After selecting the desired option, the user can select "Ok" button 111 with a mouse or other type of input device. In some embodiments, dialog 109 allows a user to specify how computer 1 is to be shut down. For example, drop down list 113 may offer the user the opportunity to specify a sleep state into which the computer is to be placed.

Upon receiving a user instruction to shut down computer 1, client object 103 instructs power state selector 105 to determine an appropriate sleeping state for computer 1 (arrow 101). In at least some embodiments, power state selector 105 is an COM (Component Object Model) architecture object. Using an algorithm described in more detail below, power state selector 105 then receives input data from other components of OS 14 regarding various system parameters, and selects the best sleeping state for computer 1. In some embodiments, power state selector 105 returns the selected sleep state to client object 103 (shown as broken line arrow 115). Client object 103 then implements the selected sleep state by interaction with other components 107 of OS 14 (arrows 117). Power state selector 105 may also have a callback interface by which client object 103 can instruct power state selector 105 to perform a quick shutdown. In response to a quick shutdown request, power state selector 105 selects the best sleep state for computer 1 and then causes the appropriate components of OS 14 to implement that selection (broken line arrows 119).

FIGS. 4-7 are a flow chart showing an algorithm used by power state selector 105, according to at least some embodiments of the invention, for selecting a sleep state in response to a shutdown request from a user. The algorithm commences at start block 200. At block 202, the algorithm determines if the computer is equipped with a system battery (e.g., a rechargeable battery such as is commonly used with many lap top computers). For example, the WINDOWS operating system includes a data structure named SYSTEM_POWER_CAPABILITIES. Contained within that structure is a Boolean member named SystemBatteriesPresent which is TRUE if there are one or more batteries in the system, and FALSE otherwise. If there is a battery (SystemBatteriesPresent=TRUE), the algorithm proceeds to block 204. At block 204, the algorithm determines the value of a "PowerRemaining" variable (abbreviated as "PR" in FIGS. 4-8). The PowerRemaining variable represents an estimate of the remaining battery life, i.e., the remaining time during which the computer's battery can be relied upon to supply power.

In at least some embodiments, the algorithm of FIGS. 4-7 determines the value of PowerRemaining by calling a separate subroutine. FIG. 8 is a flow chart for one such subroutine. After being initiated at block 240, the subroutine determines if there is a "time remaining" value supplied by the computer (abbreviated as "TR" in FIG. 8). In particular, certain computer manufacturers include software and/or firmware which will calculate the amount of time remaining for a battery charge. If the computer has such a feature, it is assumed that the TR value is reasonably accurate, and the subroutine proceeds along the "yes" branch from block 242 to block 244. At block 244, PowerRemaining is set to the TR value supplied by the computer, and the subroutine returns this value to the algorithm of FIGS. 4-7. If the computer does not supply a TR value, the subroutine proceeds on the "no" branch from block 242 to block 246. At block 246, the subroutine determines a value for the variable "PercentageRemaining" (abbreviated as "% R"). In particular, PercentageRemaining represents the percent of the battery's full capacity that remains. In at least some embodiments, the value of PercentageRemaining is obtained from the BatteryLifePercent member of the SYSTEM_POWER_STATUS data structure of the WINDOWS operating system. If a value for PercentageRemaining cannot be calculated, the subroutine proceeds on the "no" branch to block 248. A PercentageRemaining would be undeterminable if, for example, the user had removed a battery from a laptop computer and was powering that laptop computer using an external power supply. If the battery has been removed, PowerRemaining is set to "unknown" (e.g., a very large value that would be recognized by the algorithm as indicative of an unknown value) at block 248, and that value is returned to the algorithm of FIGS. 4-7.

If PercentageRemaining is determinable, the subroutine proceeds on the "yes" branch from block 246 to block 250. At block 250, the subroutine determines if a value is available for the variable "BatteryFullCapacity" ("BFC"). This variable represents an estimate of the amount of time the battery would last when beginning use with a full charge. In at least some embodiments, the value for BatteryFullCapacity is obtained from the BatteryFullLifeTime member of the SYSTEM_POWER_STATUS structure in the WINDOWS operating system. If a BatteryFullCapacity value is available, the subroutine proceeds on the "yes" branch from block 250 to block 254. At block 254, the subroutine sets PowerRemaining equal to the product of BatteryFullCapacity and PercentageRemaining divided by 100, and then returns that value to the algorithm of FIGS. 4-7. If no BatteryFullCapacity value is available, the subroutine proceeds on the "no" branch from block 250. At block 252, the subroutine returns a PowerRemaining value of 7200*PercentageRemaining/100. This formula assumes the computer battery would last at least two hours (7200 seconds) in an S3 sleep state.

Returning to FIG. 4, if the value of PowerRemaining returned to block 204 by the subroutine of FIG. 8 is (or corresponds to) "unknown," the algorithm proceeds on the "yes" branch to select a sleep state of S4. This combination of conditions—a computer equipped with a battery and an inability to determine the power remaining for the battery—indicates that the battery has been removed, and that the computer is operating on externally supplied power (e.g., an external power supply for a laptop computer). Sleep state S4 is an appropriate choice under such conditions, as removal of external power during an S3 state would result in a data loss.

Figure 4:
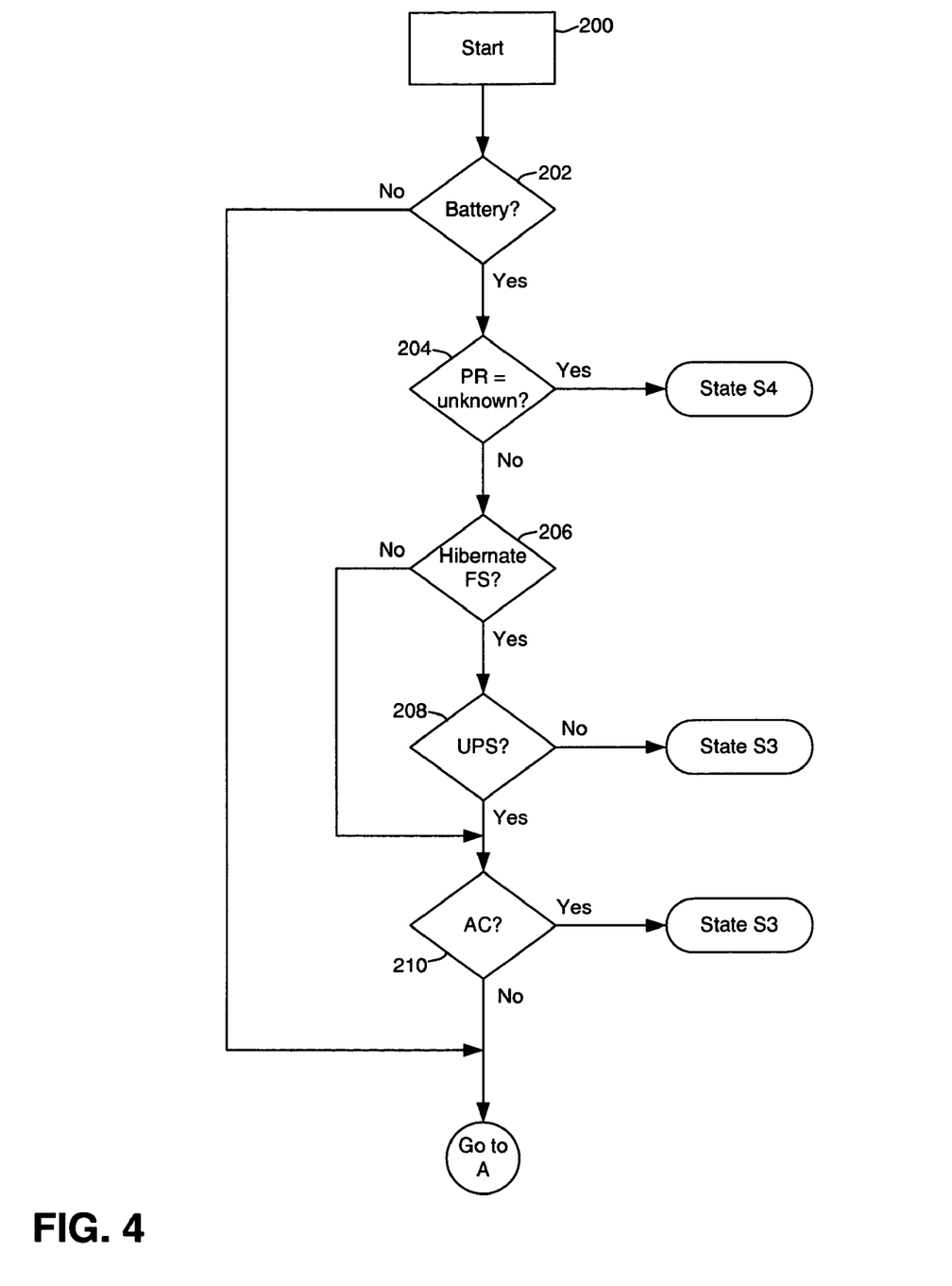
FIGS. 4-7 are a flow chart of a power state selection algorithm according to at least some embodiments of the invention.

If at block 204 the PowerRemaining value is not unknown, the algorithm proceeds on the "no" branch to block 206. At block 206, the algorithm determines if the computer is equipped with a hibernate fail-safe feature. As previously discussed, some types of computers have a built-in critical battery alarm feature which will wake a computer from an S3 sleep state when battery power reaches a certain low level. Once awoken from the S3 state, the computer is then placed in a safer S4 state. If this hibernate fail safe feature is present, it is safe to select an S3 state when the computer's battery is in place. In some embodiments, the presence of a hibernate fail safe feature is determined by examining the critical alarm settings. If one of those settings is set to hibernate, it can be assumed that the system will go into hibernation when battery power becomes too low. If a hibernate fail safe feature is detected at block 206, the algorithm proceeds on the "yes" branch to block 208. At block 208, the algorithm determines if an uninterruptible power supply (UPS) is present.

In at least some embodiments, the presence of a UPS is determined by examining the BatteriesAreShortTerm Boolean member of the WINDOWS operating system SYSTEM_POWER_CAPABILITIES structure. The BatteriesAreShortTerm flag is TRUE if a UPS is present. Notably, however, data reported by the SystemBatteriesPresent and BatteriesAreShortTerm variables of SYSTEM_POWER_CAPABILITIES is dependent upon driver programs that may be supplied by a battery manufacturer (either of a UPS or of an internal battery). Ideally, a UPS would report itself as a short term battery, and would not report itself as a system battery. In all known cases, however, a UPS will report itself as a system battery and as a short term battery. Without detailed knowledge of the battery driver(s) in use, or knowledge of other system parameters (e.g., whether a value for PowerRemaining can be determined), it is difficult (if not impossible) to know whether TRUE values for both variables indicates that (1) the computer can support system battery and has a UPS attached, or (2) the computer does not support a system battery but does have a UPS attached. Stated differently, SystemBatteriesPresent=TRUE and BatteriesAreShortTerm=FALSE are strong evidence of a computer that supports an internal battery (which may or may not be attached), and which does not have an attached UPS. However, TRUE values for the two variables cannot be relied upon to indicate both battery types.

Accordingly, if the absence of a UPS is detected at block 208, the algorithm proceeds on the "no" branch from block 208 and selects sleep state S3. This combination of system parameters is strongly indicative of a laptop computer having an installed battery, and with a hibernate fail safe that will prevent data loss if the battery is exhausted. If a UPS is detected, the algorithm proceeds on the "yes" branch to block 210. This combination of system parameters is consistent with a computer having the capacity for a system battery, but where a UPS could be hiding the removal of that system battery. Although the availability of a PowerRemaining value (block 204) suggests the system battery is in place, it is possible that the PowerRemaining value is associated with the UPS. Moreover, the hibernate fail safe feature detected at block 206 may not be helpful if the detected system battery is a UPS. A hibernate fail safe feature is generally intended to wake a computer when the computer's internal battery reaches a certain level; the hibernate fail safe may not be able to detect a drop in UPS battery capacity.

Figure 5:
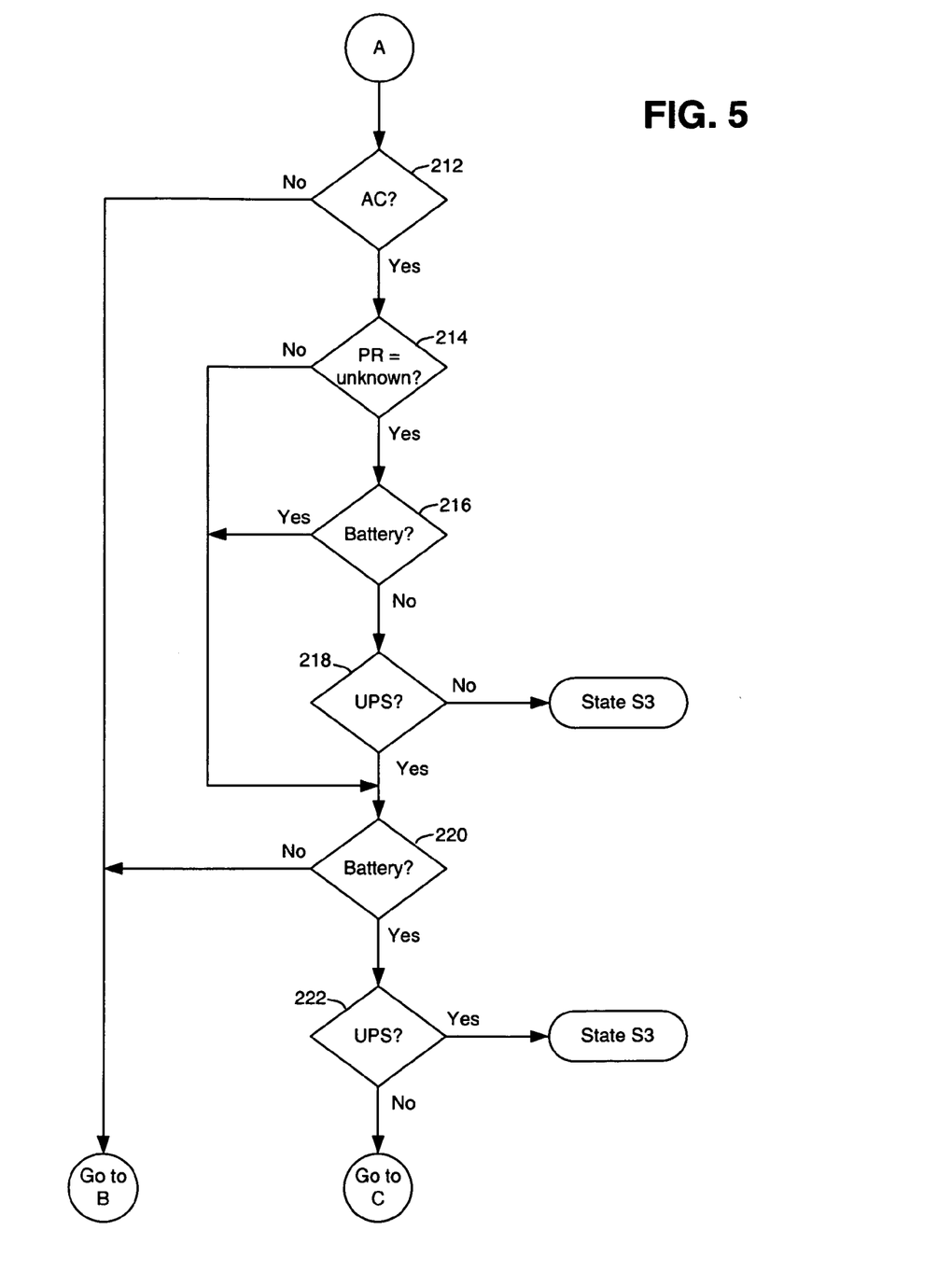

At block 210, which is also reachable on the "no" branch from block 206, the algorithm determines if the computer is receiving power from an AC source (e.g., from a wall outlet). In at least some embodiments, the AC power status is determined from the ACLineStatus member of the SYSTEM$_{13}$POWER$_{13}$STATUS structure. If the computer is receiving AC power, the algorithm proceeds on the "yes" branch from block 210 to state S3. This combination of parameters (AC power, UPS in place, known PowerRemaining value) is indicative of a computer that either has a system battery or an attached UPS, but is currently plugged in. If AC power is not detected at block 210, the algorithm proceeds on the "no" branch from block 210, via off-page connector A, to block 212 (FIG. 5).

At block 212, and because block 212 is also reachable from the "no" branch of block 202 (thereby bypassing tests for power remaining, for a system battery, etc.), the algorithm determines whether the computer is receiving AC power. If not, the algorithm proceeds on the "no" branch to block 224 (FIG. 6) via off-page connector B, which is discussed below. If the computer is receiving AC power, the algorithm proceeds on the "yes" branch from block 212 to block 214. At block 214, the algorithm determines the value of PowerRemaining (using the previously-described subroutine of FIG. 8). If the PowerRemaining value is known (i.e., not unknown), the algorithm proceeds directly on the "no" branch to block 220. If the PowerRemaining value is unknown, the algorithm instead takes the "yes" branch to block 216. At block 216, the algorithm determines if a system battery is present. If so, the algorithm proceeds directly to block 220 via the "yes" branch. If a system battery is not present, the algorithm takes the "no" branch to block 218, where it is determined whether a UPS is present. If a UPS is not present, an S3 state is selected from the "no" branch of block 218. This combination of system parameters (absence of a system battery or UPS, presence of AC power, and unknown PowerRemaining value) indicates that the computer is a desktop computer. State S3 is considered appropriate with regard to a desktop computer. Although it is possible for the computer to become accidentally unplugged, this is not common. Because inadvertent power loss is uncommon, the faster working state resumption associated with state S3 is selected. If a UPS is detected at block 218, the algorithm proceeds on the "yes" branch to block 220.

At block 220, the algorithm determines if a system battery is present (block 220 can possibly be reached via the "no" branch from block 214, thereby bypassing the "Battery?" test of block 216). If a system battery is not present, the algorithm proceeds on the "no" branch, via off-page connector B, to block 224 (FIG. 6), discussed below. If a system battery is detected, the algorithm proceeds on the "yes" branch from block 220 to block 222. At block 222, the algorithm determines if a UPS is present. If so, an S3 sleep state is selected from the "yes" branch of block 222. Once again, this combination of system parameters suggests a desk top computer. State S3 is accordingly selected for a faster working state resumption. Moreover, the presence of a UPS and AC power indicates that the computer will have sufficient power to safely sustain an S3 state for a prolonged period.

Figure 7:
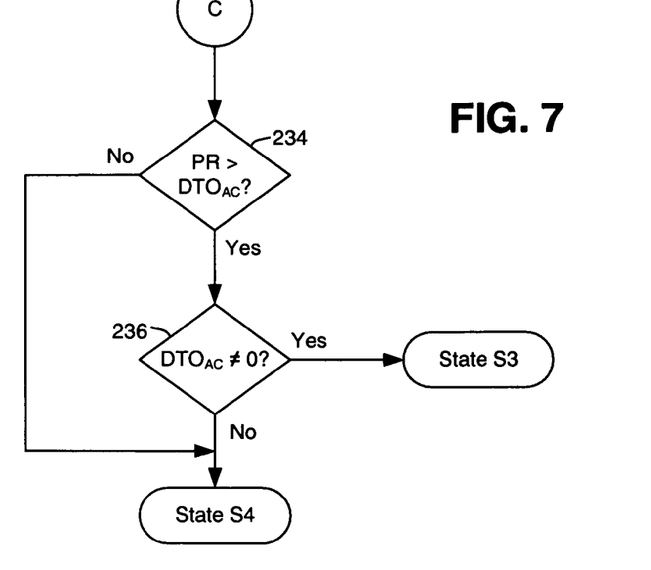
Figure 8:
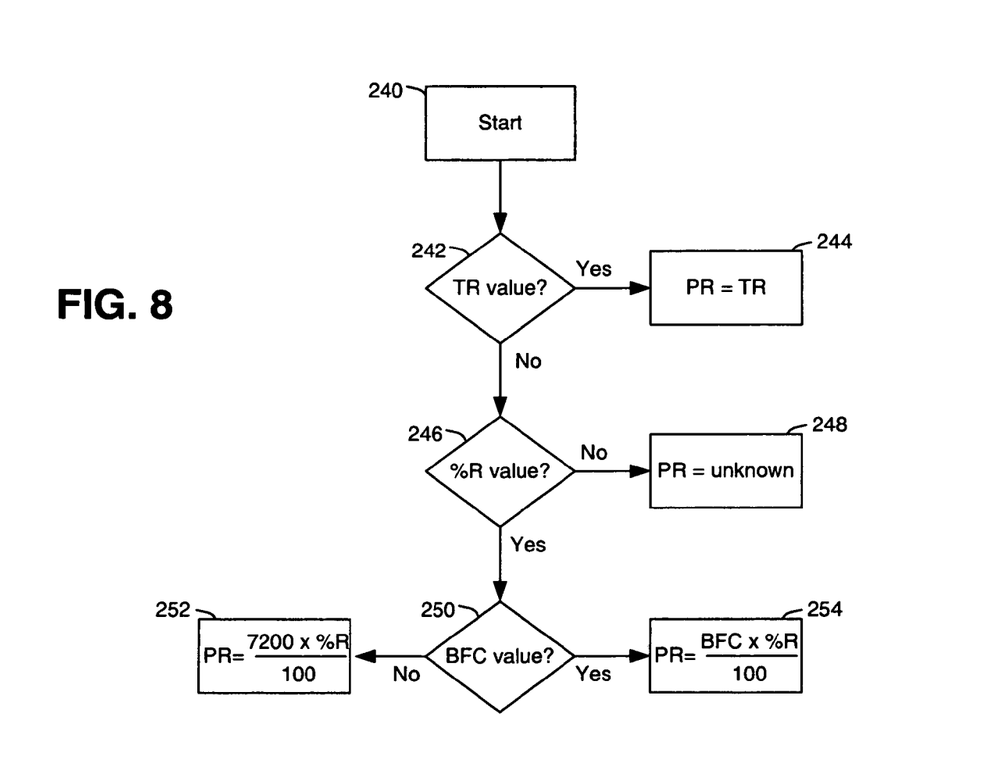
FIG. 8 is a flow chart of a subroutine, according to at least some embodiments of the invention, for calculating remaining battery life.

If a UPS is not detected at block 222, the algorithm proceeds on the "no" branch, via off-page connector C, to block 234 (FIG. 7). At block 234, the algorithm determines if the value of PowerRemaining is greater than the "doze time out" value for the computer when operating on AC power. Although not all computer systems include a hibernate fail safe algorithm, all known laptop computers are configurable to time out after "dozing" for a certain period in an S3 state. At the end of this time out period, the computer then automatically transitions to an S4 state. Typically, a laptop computer will have separate doze time out values for AC power (i.e., when the computer's charger is plugged in) and DC power (i.e., when the charger is not plugged in) states. In the WINDOWS operating system, the AC and DC doze time out values are stored as the DozeTimeoutAc and DozeTimeOutDc members of the MACHINE_POWER_POLICY structure. If the PowerRemaining value is greater than the applicable doze time out value, there is most probably sufficient battery life for the computer to reach state S4 from state S3.

Because block 234 is reached if the computer is receiving AC power, the AC doze time out is used. If PowerRemaining is greater than the AC doze time out ("DTO$_{AC}$"), the algorithm proceeds on the "yes" branch to block 236. At block 236, the algorithm determines if the doze time out has been set to zero. A value of zero would indicate the computer has been intentionally configured not to enter an S3 state, and to instead go directly to state S4. If the AC doze time out is nonzero, the algorithm selects an S3 state from the "yes" branch of block 236. If the AC doze time out is zero, or if the PowerRemaining is not greater than the doze time out (the "no" branch from block 234), an S4 state is selected.

Figure 6:
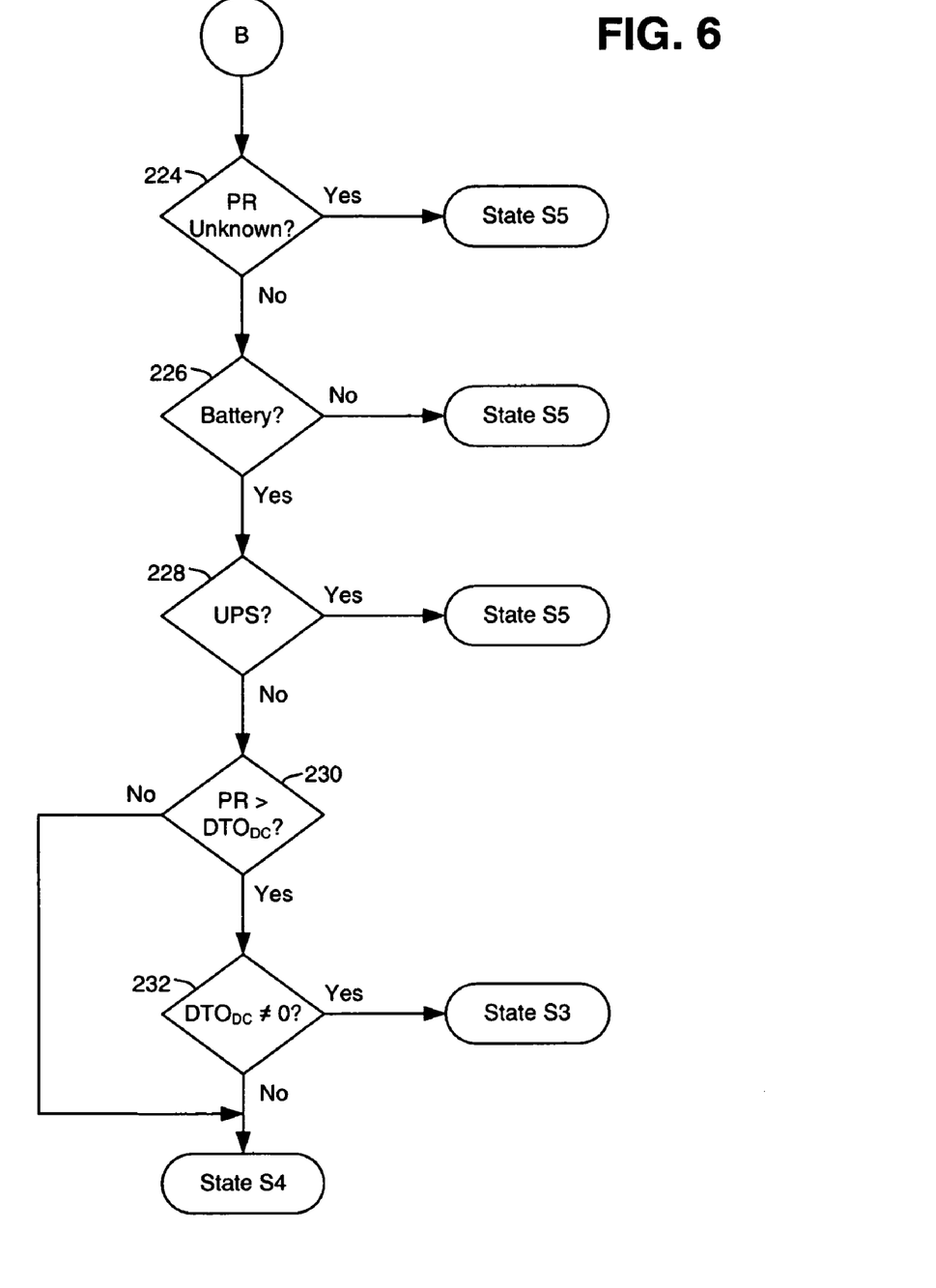

Returning to FIG. 5, the "no" branches of blocks 212 and 220 lead, via off-page connector B, to block 224 (FIG. 6).

Block 224 can be reached if the computer is not receiving AC power ("no" branch from block 212), or if the computer is receiving AC power but does not have a system battery ("no" branch from block 220). At block 224, the algorithm first determines if the value of PowerRemaining is unknown. If so, the algorithm selects state S5 on the "yes" branch from block 224. If the system is not on AC power when PowerRemaining is determined to be unknown at block 224, the system is probably running on a battery, and there may be a fault in the computer's ability to determine PowerRemaining. If the system is receiving AC power, PowerRemaining is unknown, and the system battery has been removed, block 224 will not be reached. That combination of system parameters would have resulted in selection of state S4 from block 204 (FIG. 4).

If the PowerRemaining value is not unknown at block 224, the algorithm proceeds on the no branch to block 226. At block 226 the algorithm determines if a system battery is present. If not, state S5 is selected on the "no" branch. If a system battery is not detected but a PowerRemaining value is available, there is likely a system error. If a system battery is detected at block 226, the algorithm proceeds on the "yes" branch to block 228. At block 228, the algorithm determines if a UPS is present. If so, the algorithm proceeds on the "yes" branch and selects power state 5. As previously indicated, TRUE values for both SystemBatteriesPresent and BatteriesAreShortTerm could indicate that the batteries detected in block 226 are UPS batteries (i.e., there are no internal batteries), or that there are internal batteries and a UPS. It is only possible to reach block 228 if there is no AC power to the computer (if there is a system battery and the battery detecting components are functioning properly, the "no" branch is not taken at block 220 in FIG. 5). Because the computer could thus be relying solely on UPS batteries, state S5 is selected on the "yes" branch from block 228 as the safest choice.

If a UPS is not detected at block 228, the algorithm instead proceeds on the "no" branch to block 230. At block 230, similar to block 234 (FIG. 7), the algorithm determines if PowerRemaining is greater than a doze time out. In block 230, however, the DC value for doze time out is used. Block 230 is only reached if AC power is not being supplied. If AC power were being supplied and a system battery not present, state S5 would have been selected from block 226. If PowerRemaining is greater than the DC doze time out, the algorithm proceeds on the "yes" branch to block 232 and determines if the DC time out value ("$DTO_{DC}$") is nonzero. If so, state S3 is selected from the "yes" branch. If the DC time out is zero, state S4 is selected on the "no" branch. State S4 is also selected on the "no" branch from block 230.

Figure 9:
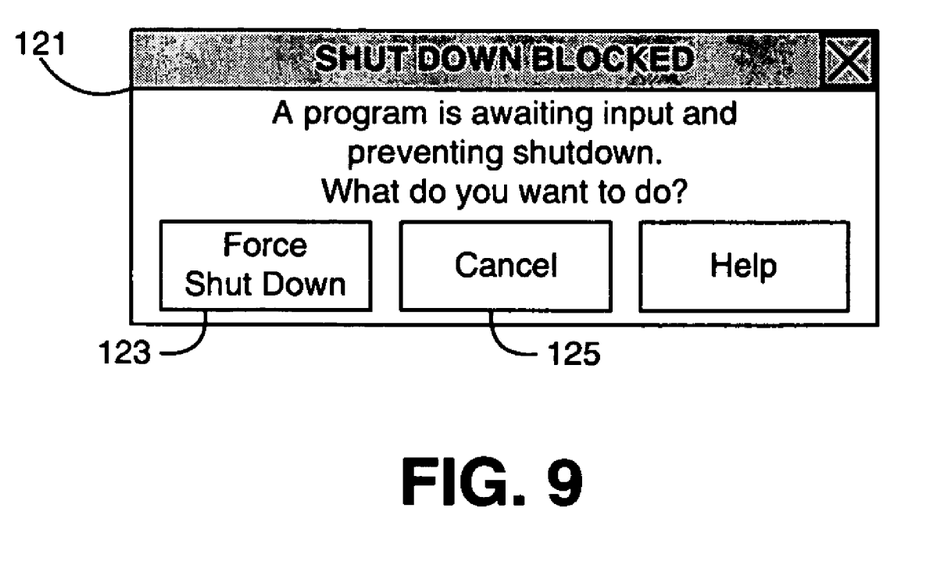
FIG. 9 is a drawing of a shutdown failure dialog according to at least some embodiments of the invention.

In some embodiments of the invention, power state selector 105 (FIG. 2) may modify a power state selection based on the success of a previous shutdown attempt. In particular, an attempted shutdown might be blocked by an application program and/or by one or more OS components (e.g., a driver). In the event of a failed shutdown attempt, a dialog is shown to the user to indicate the failure, and to request input from the user regarding how to respond. FIG. 9 is an example of a dialog 121 for a failed shutdown. Dialog 121 includes two buttons 123 and 125 which a user can select (with, e.g., a mouse). When a user selects button 125 ("Cancel"), power state selector 105 terminates the attempted shutdown. When a user selects button 123 ("Force Shut Down"), power state selector 105 causes any blocking application programs to be closed, even if such closure results in loss of user data. It may also be the case that the application or OS program that is blocking shutdown would stop blocking if a different sleep state were selected. Selection of button 123 also indicates to power state selector 105 that the user does not want to modify a sleep state selection in order to expedite shutdown. If the user does not respond to dialog 121 within a time out period for dialog 121, power state selector 105 may automatically attempt to modify the sleep state selection.

Figure 10:
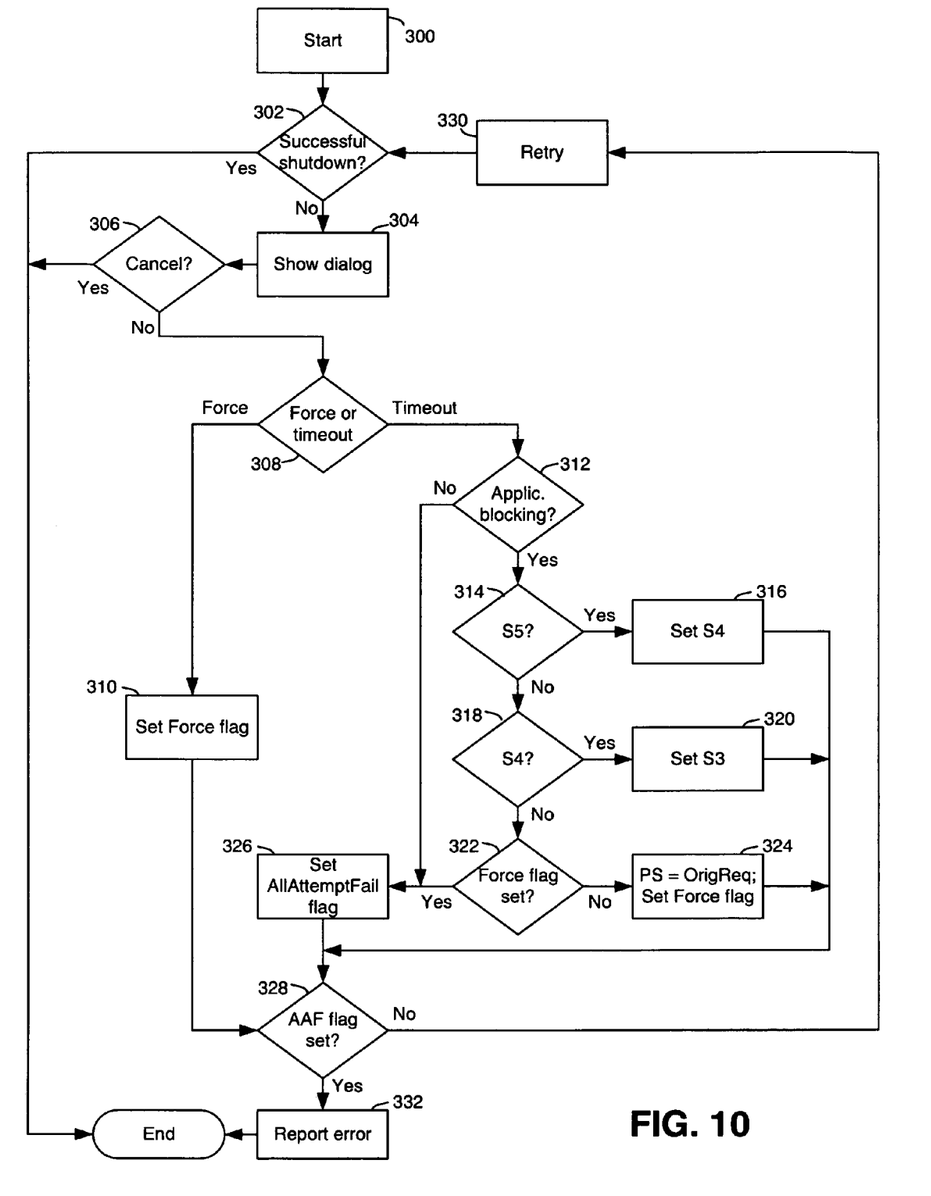
FIG. 10 is a flow chart for an algorithm, according to at least some embodiments of the invention, for responding to an unsuccessful shutdown attempt.

FIG. 10 is a flow chart for a shutdown failure algorithm implemented by power state selector 105 in at least some embodiments. Although programming instructions for implementing the algorithm of FIG. 10 may be contained within power state selector object 105, such instructions could also be located in one or more separate objects. Beginning at start block 300, shutdown is attempted by specifying a selected sleep state into which the computer is to be placed and whether the shutdown may be forced (i.e., whether blocking applications may be closed to achieve shutdown). In some embodiments, shutdown is performed by calling a routine AttemptShutdown(PowerStateRequest, ForceShutdown). The PowerStateRequest parameter may be the sleep state selected by power state selector in the algorithm of FIGS. 4-7, or may be a sleep state specifically chosen by the user (from, e.g., drop down list 113 in FIG. 3). The ForceShutdown parameter is TRUE if blocking applications may be closed to achieve shutdown, and is otherwise FALSE. If AttemptShutdown succeeds, the computer enters the selected sleep state. If AttemptShutdown does not succeed, it returns a value of FALSE.

At block 302, a determination is made as to whether the shutdown attempt failed. In some embodiments, a variable (e.g., "ShutdownSuccess") is set equal to the returned value of AttemptShutdown. If ShutdownSuccess=FALSE, the algorithm proceeds from the "no" branch of block 302. If the shutdown attempt succeeds, the algorithm will terminate ("yes" branch to "End").

At block 304, the algorithm shows a shutdown failure dialog (e.g., as in FIG. 9). In at least some embodiments, calling a routine ShowShutdownFailureDialog( ) causes the dialog to be displayed to the user. The subroutine returns one of three values to the calling algorithm. "Force" is returned if the user selects button 123 in FIG. 9. "Cancel" is returned if the user selects button 125 in FIG. 9. "Timeout" is returned if the user does not make a selection from dialog 121 within a time out period. At block 306, the algorithm determines if the user has pressed the "Cancel" button (i.e., whether ShutDownFailureDialog( ) has returned "cancel"). If so, the algorithm proceeds on the "yes" branch from block 306 and terminates. If the user did not select "cancel," the algorithm proceeds on the "no" branch to block 308.

At block 308, the algorithm determines if the user has pressed "Force Shut Down" button 123 (i.e., whether ShutDownFailureDialog( ) has returned "force") or if the user has failed to take action (i.e., whether ShutDownFailureDialog( ) has returned "timeout"). If the user pressed the "Force Shut Down" button, the algorithm proceeds on the "Force" branch from block 308 and sets the ForceShutdown parameter to TRUE at block 310. The algorithm then proceeds to block 328. At block 328, the algorithm determines if all shutdown attempts have failed. The determination of whether all attempts have failed is described below. Because all attempts will not have failed if block 328 is reached from block 310, the algorithm proceeds on the "no" branch to block 330, where shutdown is again attempted. In particular, AttemptShutdown is again called, but with the ForceShutdown parameter now set to TRUE.

Returning to block 308, a lack of user response to the failure dialog results in the algorithm proceeding on the "Timeout" branch from block 308. At block 312, the algorithm determines if the shutdown is being blocked by an application program or by an OS program such as a driver. If a driver or other OS program is blocking shutdown, the problem must be resolved before shutdown can occur, and the algorithm proceeds on the "no" branch from block 312 to block 326. Block 326 is described below. If an application is blocking shutdown, the algorithm proceeds on the "yes" branch from block 312 to block 314. At block 314, the algorithm determines if the selected sleep state is S5 (i.e., whether PowerStateRequest equals S5). If so, the algorithm proceeds on the "yes" branch to block 316, where the selected sleep state is changed to S4. The algorithm then proceeds from block 316 to block 328. Because all shutdown attempts have will not have failed if block 328 is reached from block 316, the algorithm proceeds on the "no" branch to block 330. At block 330, AttemptShutdown is called with the new value for PowerStateRequest.

Returning to block 314, the algorithm proceeds on the "no" branch from block 314 if PowerStateRequest does not equal S5. The user or power state selector 105 may have initially selected a state other than S5, or block 318 may be reached during a repeat pass through the loop. For example, the selected power state may have originally been S5, but have been changed to S4 during a prior loop pass. At block 318, the algorithm determines if PowerStateRequest equals S4. If so, the algorithm proceeds on the "yes" branch to block 320 and sets PowerStateRequest to equal S3. The algorithm then proceeds to block 328, and from block 328 to block 330. At block 330, AttemptShutdown is called with PowerStateRequest set to S3.

Returning to block 318, the algorithm proceeds on the "no" branch from block 318 if PowerStateRequest does not equal S4. At block 322, the algorithm determines if the ForceShutdown flag is set to TRUE. If not, the algorithm proceeds on the "no" branch to block 324. At block 324, ForceShutdown is set to TRUE. PowerStateRequest is also returned to its initial value (i.e., the value at start block 300). From block 324, the algorithm proceeds to block 328, and from block 328 to block 330. At block 330, AttemptShutdown is called with PowerStateRequest set to its original value and ForceShutdown set to TRUE.

If at block 322 the ForceShutdown flag is already set to TRUE, the algorithm proceeds on the "yes" branch to block 326, where the AllAttemptsFailed flag is set to TRUE. At this stage, the algorithm has effectively determined that none of the options in the algorithm will work (i.e., all attempts to shut down the computer have failed). From block 326, the algorithm goes to block 328. In this case, however, the AllAttemptsFailed flag is set, and the algorithm does not go to block 330 to retry shutdown. Instead, the algorithm proceeds on the "yes" branch to block 332 and reports the shutdown error to the user. At this point, the user may be forced to attempt a "hard" shutdown (i.e., pressing the OFF button until the computer enters a an ACPI G3 ("mechanical off") state, to isolate the driver or other system element causing the problem, or take other steps. From block 332, the algorithm terminates.

Attached hereto as Appendix A is a pseudo code listing for one implementation of the algorithm described in connection with FIGS. 4-7. Appendix B is a pseudo code listing for an implementation of the subroutine described by reference to FIG. 8. Appendix C is a pseudo code listing for an implementation of the algorithm described in connection with FIG. 10. Because the variable names used in Appendices A-C generally correspond to similar elements used to describe FIGS. 4-7, 8 and 10, and because the code listings will be readily understood by persons skilled in the art in light of the above discussion, additional discussion of Appendices A-C is unnecessary.

Although specific examples of carrying out the invention have been described, those skilled in the art will appreciate that there are numerous other variations and permutations of the above described systems and techniques that fall within the spirit and scope of the invention as set forth in the appended claims. These and other modifications are within the scope of the invention as defined by the attached claims. In the claims, various portions of the claims are prefaced with letter or number references for convenience. However, use of such references does not imply a temporal relationship not otherwise required by the language of the claims.

APPENDIX A

```
//
// default to recommending Shut Down as the best option. This will be
// used if no other conditions allow S3 or S4
//
Recommend = S5 (Shut Down)
If (SystemBatteriesPresent AND (PowerRemaining = UNKNOWN))
{
    Recommend = S4 (Hibernate)
}
If (Recommend = S5)
{
    If (SystemBatteriesPresent AND
        ((HibernateFailSafeEnabled AND NOT BatteriesShortTerm) OR
        (BatteriesShortTerm AND (LineState = AC)))
    {
        Recommend = S3 (Sleep)
    }
}
If (Recommend = S5)
{
    If (LineState = AC)
    {
        If (PowerRemaining == UNKNOWN)
        {
            If (NOT SystemBatteriesPresent AND NOT
                BatteriesShortTerm)
            {
                Recommend = S3 (Sleep)
            }
        }
        Else
        {
            If (SystemBatteriesPresent AND BatteriesShortTerm)
            {
                Recommend = S3 (Sleep)
            }
            Else if (SystemBatteriesPresent AND NOT
                BatteriesShortTerm)
            {
                If ((PowerRemaining > DozeS4ACTimeout) AND
                    (NOT (DozeS4ACTimeout = 0)))
                {
                    Recommend = S3 (Sleep)
                }
                Else
                {
                    Recommend = S4 (Hibernate)
                }
            }
        }
    }
    Else
    {
        If (NOT (PowerRemaining = UNKNOWN))
        {
            If (SystemBatteriesPresent && (NOT BatteriesShortTerm))
            {
                If ((PowerRemaining > DozeS4DCTimeout) AND
                    NOT (DozeS4DCTimeout = 0))
                {
                    Recommend = S3
                }
            }
```

APPENDIX A-continued

```
            Else
            {
                Recommend = S4
            }
        }
    }
  }
}
```

APPENDIX B

```
// BFC stands for battery full capacity time, in seconds
// PR stand for percentage remaining
// TR stands for time remaining
//
// Start by assuming that the actual time remaining equals the time
// remaining (if reported by the computer)
PowerRemaining = TR
If (TR = UNKNOWN)
{
    If ((NOT (BFC = UNKNOWN)) AND (NOT (PR = UNKNOWN)))
    {
        PowerRemaining = BFC * (PR / 100)
    }
    Else if (NOT (PR = UNKNOWN))
    {
        PowerRemaining = 7200 * (PR / 100)
    }
}
```

APPENDIX C

```
// PowerStateRequest is initialized to the power state the user is
// attempting to put the computer into.
// ShutdownFailureReason is set by the AttemptShutdown routine to the
// reason for the failure.
OriginalPowerStateRequest = PowerStateRequest
ForceShutdown = FALSE;
AllAttemptsFailed = FALSE;
dialogResult = Unknown;
do
{
  ShutdownSuccess = AttemptShutdown(PowerStateRequest,
  ForceShutdown);
  if ((ShutdownSuccess == FALSE))
  {
    dialogResult = ShowShutdownFailureDialog( );
    if (dialogResult == TimedOut)
    {
      if (ShutdownFailureReason == ApplicationBlocking)
      {
        if (PowerStateRequest == S5)
        {
          // the user is attempting to shut down but not responding
          // to the "application blocking" dialog. We'll try to
          // hibernate instead
              PowerStateRequest = S4;
        } else if (PowerStateAttempt == S4)
        {
          // this is for the case where an app blocks S4 but is OK
          // with S3
              PowerStateRequest = S3;
        } else
        {
            if (NOT ForceShutdown)
            {
            // alternate power states aren't working. We'll force
            // now; we choose power savings and hardware safety over
            // app data
                PowerStateRequest = OrigPowerStateRequest;
                ForceShutdown = TRUE;
            }
```

APPENDIX C-continued

```
            else
            {
            // nothing's working, even force; stop trying
                AllAttemptsFailed = TRUE;
            }
        }
    } else
    {
        // we can't force in the case of a driver blocking. We
        // just have to fail.
        AllAttemptsFailed = TRUE;
    }
    } else if (dialogResult == Force)
    {
      ForceShutdown = TRUE;
    }
  }
} until (ShutdownSuccess OR AllAttemptsFailed or (dialogResult ==
UserCancelled))
if (AllAttemptsFailed)
{
  ReportShutdownError( )
}
```

The invention claimed is:

1. A computer-readable storage medium having stored thereon data representing sequences of instructions which, when executed by a processor, cause the processor to perform steps comprising:
 (a) receiving a user instruction to shut down a computer supporting a plurality of power states, the plurality of power states including
  a first power state in which supply of electrical power to selected components is discontinued but in which power supply to a volatile memory storing user data is maintained, and
  a second power state in which supply of electrical power to the volatile memory is removed and in which, prior to said removal, at least some of the user data is transferred from the volatile memory to a non-volatile memory;
 (b) selecting the first power state in response to the user instruction and based on a first set of configuration parameters, the first set of configuration parameters including whether the computer supports a system battery and whether a value is determinable for remaining battery life; and
 (c) selecting the second power state in response to the user instruction and based on a second set of device configuration parameters.

2. The computer-readable storage medium of claim 1, wherein the plurality of power states includes a third power state distinct from the first and second power states, and comprising further instructions for performing steps comprising:
 (d) selecting the third power state based on a third set of configuration parameters.

3. The computer-readable storage medium of claim 1, wherein step (c) comprises selecting the second power state based on the computer supporting a system battery and a value for remaining battery life being not determinable.

4. The computer-readable storage medium of claim 1, wherein the configuration parameters include:
 whether the computer is connected to an uninterruptible power supply (UPS), and
 whether the computer is capable of automatically transitioning from the first power state to the second power state if battery power reaches a predetermined level.

5. A computer-readable storage medium having stored thereon data representing sequences of instructions which, when executed by a processor, cause the processor to perform steps comprising:
  receiving an instruction to select an unspecified one of a plurality of selectable power states for an electronic device, the plurality of power states including
    a first power state in which supply of electrical power to selected device components is disconnected but in which power supply to a volatile memory storing user data is maintained, and
    a second power state in which supply of electrical power to the volatile memory is removed and in which, prior to said removal, at least some of the user data is transferred from the volatile memory to a non-volatile memory; and
  selecting the first power state based on
    the device supporting a system battery,
    a value for remaining battery life being determinable,
    device being capable of automatically transitioning from the first power state to the second power state if battery power reaches a predetermined level, and
    the device not being connected to an uninterruptible power supply (UPS).

6. A computer-readable storage medium having stored thereon data representing sequences of instructions which, when executed by a processor, cause the processor to perform steps comprising:
  receiving an instruction to select an unspecified one of a plurality of selectable power states for an electronic device, the plurality of power states including
    a first power state in which supply of electrical power to selected device components is disconnected but in which power supply to a volatile memory storing user data is maintained, and
    a second power state in which supply of electrical power to the volatile memory is removed and in which, prior to said removal, at least some of the user data is transferred from the volatile memory to a non-volatile memory;
  selecting the first power state based
    the device supporting a system battery,
    a value for remaining battery life being determinable,
    the device being connected to an uninterruptible power supply (UPS), and
    the device receiving AC power.

7. A computer-readable storage medium having stored thereon data representing sequences of instructions which, when executed by a processor, cause the processor to perform steps comprising:
  receiving an instruction to select an unspecified one of a plurality of selectable power states for an electronic device, the plurality of power states including
    a first power state in which supply of electrical power to selected device components is disconnected but in which power supply to a volatile memory storing user data is maintained, and
    a second power state in which supply of electrical power to the volatile memory is removed and in which, prior to said removal, at least some of the user data is transferred from the volatile memory to a non-volatile memory;
  selecting the first power state based on
    the device supporting a system battery,
    a value for remaining battery life being determinable,
    the device receiving AC power, and
    the device not being connected to an uninterruptible power supply (UPS).

8. A computer-readable storage medium having stored thereon data representing sequences of instructions which, when executed by a processor, cause the processor to perform steps comprising:
  receiving an instruction to select an unspecified one of a plurality of selectable power states for an electronic device, the plurality of power states including
    a first power state in which supply of electrical power to selected device components is disconnected but in which power supply to a volatile memory storing user data is maintained, and
    a second power state in which supply of electrical power to the volatile memory is removed and in which, prior to said removal, at least some of the user data is transferred from the volatile memory to a non-volatile memory:
  selecting the first power state based on
    the device supporting a system battery,
    the device receiving AC power, and
    the device not being connected to an uninterruptible power supply (UPS).

9. A computer-readable storage medium having stored thereon data representing sequences of instructions which, when executed by a processor, cause the processor to perform steps comprising:
  receiving an instruction to select an unspecified one of a plurality of selectable power states for an electronic device, the plurality of power states including
    a first power state in which supply of electrical power to selected device components is disconnected but in which power supply to a volatile memory storing user data is maintained, and
    a second power state in which supply of electrical power to the volatile memory is removed and in which, prior to said removal, at least some of the user data is transferred from the volatile memory to a non-volatile memory;
  selecting the first power state based on
    the device supporting a system battery,
    the device not being connected to an uninterruptible power supply (UPS), and
    the value of remaining battery life exceeding a non-zero value for a time out interval after which the device is configured to automatically transition from the first power state to the second power state.

10. The computer-readable storage medium of claim 9, comprising further instructions for performing the steps of:
  determining the device does not provide a value for remaining battery life;
  determining the availability of a value for fully charged battery life;
  calculating battery life, if a value for fully charged battery life is available, as the constant multiplied by a value for remaining percentage of battery charge and divided by 100; and
  calculating battery life, if a value for fully charged battery life is available, as the value for fully charged battery life multiplied by a value for remaining percentage of battery charge and divided by 100.

11. A computer-readable storage medium having stored thereon data representing sequences of instructions which, when executed by a processor, cause the processor to perform steps comprising:

receiving an instruction to select an unspecified one of a plurality of selectable power states for an electronic device, the plurality of power states including a first power state in which supply of electrical power to selected device components is disconnected but in which power supply to a volatile memory storing user data is maintained, and a second power state in which supply of electrical power to the volatile memory is removed and in which, prior to said removal, at least some of the user data is transferred from the volatile memory to a non-volatile memory;

selecting the first power state based on the device supporting a system battery, the device not being connected to an uninterruptible power supply (UPS), and the value of remaining battery life exceeding a non-zero value for a time out interval after which the device is configured to automatically transition from the first power state to the second power state.

12. The computer-readable storage medium of claim 11, further comprising instructions for performing the steps of:

determining the device does not provide a value for remaining battery life;

determining the availability of a value for fully charged battery life;

calculating battery life, if a value for fully charged battery life is available, as the constant multiplied by a value for remaining percentage of battery charge and divided by 100; and calculating battery life, if a value for fully charged battery life is available, as the value for fully charged battery life multiplied by a value for remaining percentage of battery charge and divided by 100.

13. A computer-readable storage medium having stored thereon data representing sequences of instructions which, when executed by a processor, cause the processor to perform steps of a method of selecting a power state for an electronic device, the steps comprising:

receiving an instruction to select an unspecified one of a plurality of selectable power states, the plurality of power states including a first power state in which supply of electrical power to selected device components is disconnected but in which power supply to a volatile memory storing user data is maintained, and a second power state in which supply of electrical power to the volatile memory is removed and in which, prior to said removal, at least some of the user data is transferred from the volatile memory to a non-volatile memory; and a third power state distinct from the first and second power states;

selecting the first power state based on a first set of device configuration parameters;

selecting the second power state based on a second set of device configuration parameters;

(d) receiving a request to shut down the device;

(e) determining an attempt to shut down the device has been unsuccessful;

(f) determining a user has not responded to a request for additional instructions regarding device shutdown;

(g) changing a power state selection; and (h) re-attempting shutdown of the device using the changed power state selection.

14. The computer-readable storage medium of claim 13, further comprising:

(i) setting a flag indicative that an application program blocking shutdown should be closed; and (j) re-attempting shutdown of the device with the set flag.

15. The computer-readable storage medium of claim 14, further comprising:

(k) determining that shutdown has not succeeded after performance of steps (d) through (j); and (l) reporting an inability to shut down the device.

16. The computer-readable storage medium of claim 5, comprising further instructions for performing the step of selecting the first power state based on at least one of the following combinations (a) through (d) of conditions being true:

(a) the device supports a system battery, a value for remaining battery life is determinable, the device is connected to a UPS and the device is receiving AC power;

(b) the device does not support a system battery, a value for remaining battery life is not determinable, the device is receiving AC power and the device is not connected to a UPS;

(c) the device supports a system battery, the device is receiving AC power and the device is connected to a UPS; and (d) the device supports a system battery, the device is not connected to a UPS and the value of remaining battery life exceeds a non-zero value for a time out interval after which the device is configured to automatically transition from the first power state to the second power state.

17. The computer-readable storage medium of claim 16, comprising further instructions for performing the step of selecting the second power state based on the device supporting a system battery, the device not being connected to a UPS and the value of remaining battery life not exceeding a non-zero value for a time out interval after which the device is configured to automatically transition from the first power state to the second power state.

18. The computer-readable storage medium of claim 5, comprising further instructions for performing the step of selecting the second power state based on the device supporting a system battery, the device not being connected to a UPS and the value of remaining battery life not exceeding a non-zero value for a time out interval after which the device is configured to automatically transition from the first power state to the second power state.

19. The computer-readable storage medium of claim 5, comprising further instructions for performing the step of selecting the first power state based on the device supporting a system battery, a value for remaining battery life being determinable, the device being connected to a UPS and the device receiving AC power.

20. The computer-readable storage medium of claim 5, comprising further instructions for performing the step of selecting the first power state based on the device not supporting a system battery, a value for remaining battery life not being determinable, the device receiving AC power and the device not being connected to a UPS.

21. The computer-readable storage medium of claim 5, comprising further instructions for performing the step of selecting the first power state based on the device supporting a system battery, the device receiving AC power and the device being connected to a UPS.

22. The computer-readable storage medium of claim 5, comprising further instructions for performing the step of selecting the first power state based on the device supporting a system battery, the device not being connected to a UPS and the value of remaining battery life exceeding a non-zero value for a time out interval after which the device is configured to automatically transition from the first power state to the second power state.

23. The computer-readable storage medium of claim 6, comprising further instructions for performing the step of selecting the first power state based on the device not supporting a system battery, a value for remaining battery life not being determinable, the device receiving AC power and the device not being connected to a UPS.

24. The computer-readable storage medium of claim 6, comprising further instructions for performing the step of selecting the first power state based on the device supporting a system battery, the device receiving AC power and the device being connected to a UPS.

25. The computer-readable storage medium of claim 6, comprising further instructions for performing the step of selecting the first power state based on the device supporting a system battery, the device not being connected to a UPS and the value of remaining battery life exceeding a non-zero value for a time out interval after which the device is configured to automatically transition from the first power state to the second power state.

26. The computer-readable storage medium of claim 7 comprising further instructions for performing the step of selecting the first power state based on the device supporting a system battery, the device receiving AC power and the device being connected to a UPS.

27. The computer-readable storage medium of claim 7 comprising further instructions for performing the step of selecting the first power state based on the device supporting a system battery, the device not being connected to a UPS and the value of remaining battery life exceeding a non-zero value for a time out interval after which the device is configured to automatically transition from the first power state to the second power state.

28. The computer-readable storage medium of claim 8 comprising further instructions for performing the step of selecting the first power state based on the device supporting a system battery, the device not being connected to a UPS and the value of remaining battery life exceeding a non-zero value for a time out interval after which the device is configured to automatically transition from the first power state to the second power state.

* * * * *